US012767080B2

(12) United States Patent
Funato

(10) Patent No.: US 12,767,080 B2
(45) Date of Patent: Oct. 20, 2026

(54) IMPACT ABSORBING BODY

(71) Applicant: KYORAKU CO., LTD., Kyoto (JP)

(72) Inventor: Takafumi Funato, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 473 days.

(21) Appl. No.: 18/550,147

(22) PCT Filed: Mar. 23, 2022

(86) PCT No.: PCT/JP2022/013677
§ 371 (c)(1),
(2) Date: Sep. 12, 2023

(87) PCT Pub. No.: WO2022/210198
PCT Pub. Date: Oct. 6, 2022

(65) Prior Publication Data

US 2024/0157901 A1 May 16, 2024

(30) Foreign Application Priority Data

Mar. 29, 2021 (JP) ................................ 2021-056170

(51) Int. Cl.
*B60R 21/04* (2006.01)

(52) U.S. Cl.
CPC ...... *B60R 21/04* (2013.01); *B60R 2021/0414* (2013.01)

(58) Field of Classification Search
CPC .... B60R 2021/0421; B60R 2021/0414; B60R 21/04; B62D 21/152; B62D 21/15;
(Continued)

(56) References Cited

U.S. PATENT DOCUMENTS 6,695,393 B1 * 2/2004 Aouadi ................ B62D 21/152 296/203.02
2004/0124572 A1 7/2004 Tamada et al.
(Continued)

FOREIGN PATENT DOCUMENTS

JP 2004-149074 A 5/2004
JP 2009-161028 A 7/2009
(Continued)

OTHER PUBLICATIONS

International Search Report issued on Apr. 26, 2022, in corresponding International Application No. PCT/JP2022/013677; 4 pages.

*Primary Examiner* — Carly W. Lynch
(74) *Attorney, Agent, or Firm* — Maier & Maier, PLLC

(57) ABSTRACT

An impact absorber that is capable of inhibiting variation in performance by controlling buckling behavior. An impact absorber including a hollow blow molded article, wherein the blow molded article includes a front wall and a back wall separated into front and back and facing each other and a side wall connecting the front wall with the back wall, the front wall includes a tubular front side concave rib formed by indenting the front wall, the back wall includes a tubular back side concave rib formed by indenting the back wall, and the front side concave rib and the back side concave rib have distal end portions welded to each other, at least one of the front side concave rib and the back side concave rib has a buckling induction section formed as origin of buckling for impact absorption.

6 Claims, 11 Drawing Sheets

(58) Field of Classification Search
CPC ...... F16F 7/123; F16F 7/12; B60J 5/04; B60J 5/0412; B60J 5/042; B60J 5/0444; B60J 5/0401; B60J 5/0402
USPC ............ 296/187.03, 187.05, 146.6; 188/377, 188/371, 376
See application file for complete search history.

(56) References Cited

U.S. PATENT DOCUMENTS

| | | | | |
|---|---|---|---|---|
| 2004/0129518 | A1 | 7/2004 | Tamada et al. | |
| 2004/0195064 | A1 | 10/2004 | Tamada et al. | |
| 2005/0230204 | A1 | 10/2005 | Tamada et al. | |
| 2006/0076202 | A1 | 4/2006 | Tamada et al. | |
| 2006/0220290 | A1 | 10/2006 | Tamada et al. | |
| 2006/0255601 | A1 | 11/2006 | Tamada et al. | |
| 2008/0169682 | A1* | 7/2008 | Hedderly | B62D 25/08 296/193.08 |
| 2014/0191532 | A1* | 7/2014 | Hirose | B60R 19/34 296/187.03 |

FOREIGN PATENT DOCUMENTS

| | | | | | |
|---|---|---|---|---|---|
| JP | 2010-107027 | A | | 5/2010 | |
| JP | 2013044407 | A | * | 3/2013 | B60R 19/24 |
| JP | 5288996 | B2 | * | 9/2013 | B60J 5/00 |
| JP | 2016-180429 | A | | 10/2016 | |
| JP | 2017214954 | A | * | 12/2017 | B29C 49/48 |
| JP | 2019-189022 | A | | 10/2019 | |
| WO | WO-2010097690 | A1 | * | 9/2010 | B62D 21/152 |

* cited by examiner

IMPACT ABSORBING BODY

TECHNICAL FIELD

The present invention relates to an impact absorber.

BACKGROUND ART

There is an impact absorber in the past to absorb impact on people on board the vehicle on collision and the like. For example, PTL 1 discloses an impact absorber with a hollow portion configured to have a contact surface and a support surface facing each other and recessed to the other to form respective concave ribs and join a distal end portion of each concave rib to each other.

CITATION LIST

Patent Literature

PTL 1: JP 2004-149074 A

SUMMARY OF INVENTION

Technical Problem

In the configuration of joining concave ribs to each other as disclosed in PTL 1, each concave rib is configured, when impact is exerted, to vertically collapse in a bellowslike manner (buckle) to absorb the impact. However, in the case of vertical collapse in a bellowslike manner (buckling), all buckling behavior of each concave rib is not uniform and there is a risk of variation in performance.

The present invention has been made in view of such a circumstance and it is an object thereof to provide an impact absorber that is capable of inhibiting variation in performance by controlling buckling behavior.

Solution to Problem

The present invention provides an impact absorber including a hollow blow molded article, wherein the blow molded article includes a front wall and a back wall separated into front and back and facing each other and a side wall connecting the front wall with the back wall, the front wall includes a tubular front side concave rib formed by indenting the front wall, the back wall includes a tubular back side concave rib formed by indenting the back wall, and the front side concave rib and the back side concave rib have distal end portions welded to each other, at least one of the front side concave rib and the back side concave rib has a buckling induction section formed as origin of buckling for impact absorption, and when a load is applied in an axial direction of the front side concave rib and the back side concave rib, the at least one of the front side concave rib and the back side concave rib is configured to cause at least one of center of gravity of an opening surrounded by an opening edge of the front side concave rib and center of gravity of an opening surrounded by an opening edge of the back side concave rib to buckle in a mode of moving in a direction crossing the axial direction by the buckling induction section.

In the present invention, the concave rib provided with the buckling induction section buckles in the mode of moving the center of gravity of the opening in the direction crossing the axial direction, thereby avoiding vertical collapse of the concave rib in a bellowslike manner to allow inhibition of variation in performance by controlling buckling behavior.

Various embodiments of the present invention are exemplified below. The embodiments below may be combined with each other.

It is preferred that the buckling induction section is provided in an inhomogeneous position in a circumferential direction of at least one of the front side concave rib and the back side concave rib.

It is preferred that the front side concave rib is provided with a front side buckling induction section, and the back side concave rib is provided with a back side buckling induction section.

It is preferred that the front side buckling induction section is provided in a position in a first direction orthogonal to the axial direction on a tubular surrounding wall of the front side concave rib, and the back side buckling induction section is provided in a position in a second direction orthogonal to the axial direction on a surrounding wall of the back side concave rib and shifted 90 degrees or more to the first direction.

It is preferred that the front side buckling induction section is configured to cause the front side concave rib to buckle in a mode of moving the front side buckling induction section in a direction opposite to the first direction, and the back side buckling induction section is configured to cause the back side concave rib to buckle in a mode of moving the back side buckling induction section in a direction opposite to the second direction.

It is preferred that the first direction is a direction shifted 180 degrees to the second direction.

It is preferred that the impact absorber includes only one of the front side concave rib and only one of the back side concave rib.

DESCRIPTION OF EMBODIMENTS

A description is given below to embodiments of the present invention. Various characteristics in the embodiments described below may be combined with each other. Each characteristic is independently inventive.

1. Configuration of Impact Absorber 1

Figure 1:
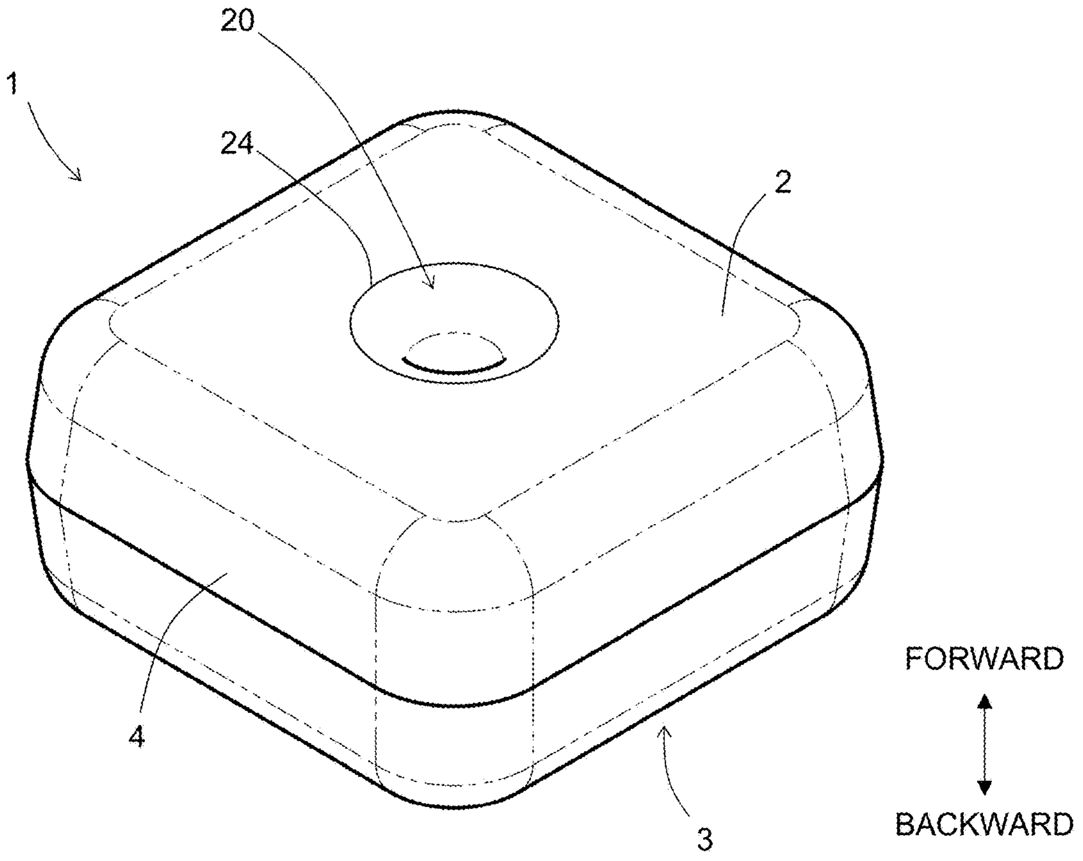
FIG. 1 is a perspective view of an impact absorber 1 according to an embodiment of the present invention.
Figure 2:
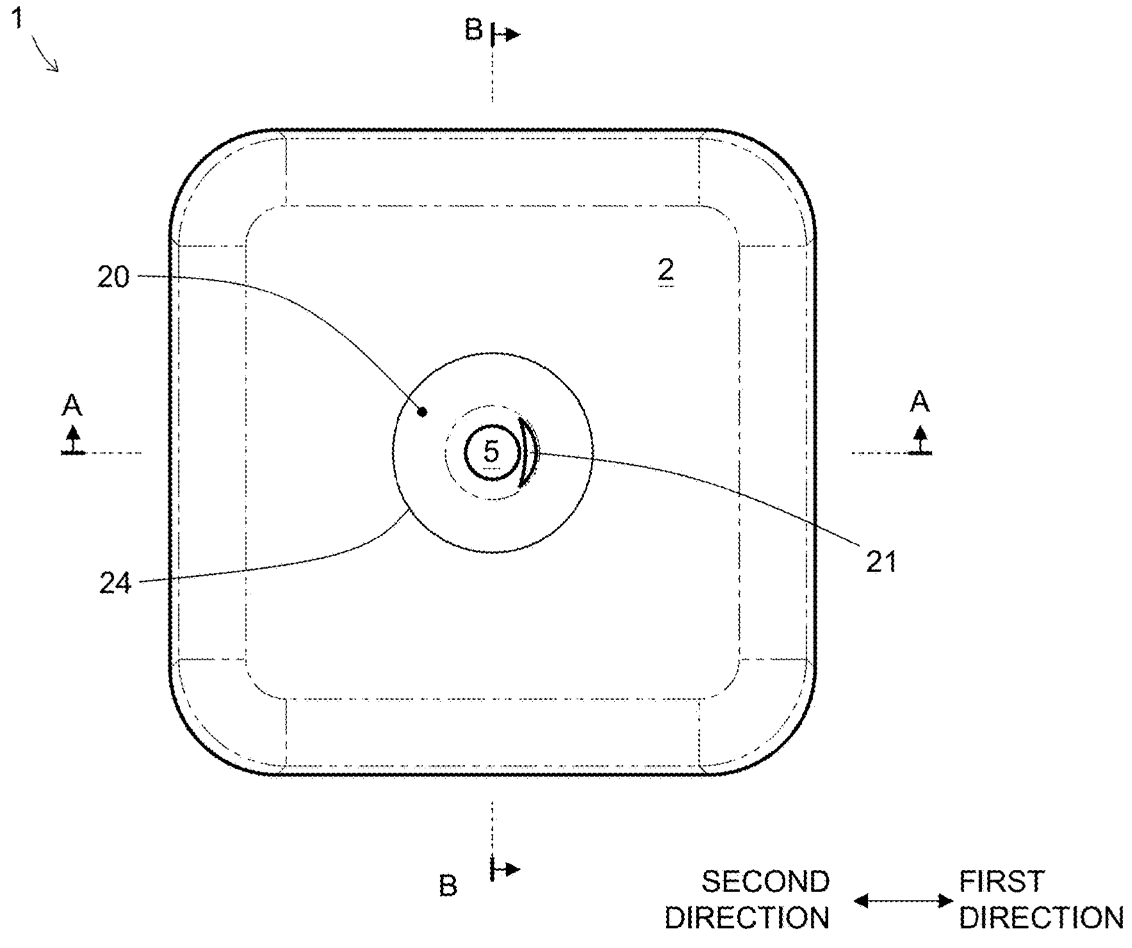
FIG. 2 is a plan view of the impact absorber 1 in FIG. 1.

At first, with reference to FIGS. 1 through 5B, a configuration of an impact absorber 1 according to an embodiment of the present invention is described. The impact absorber 1 according to the present embodiment is an impact absorber for vehicles to absorb impact from inside or outside a vehicle by building in a vehicle component, such as a door. The impact absorber 1 deforms by input of a load to absorb the impact. It should be noted that the directions of the expected load (impact) in description below, that is, the directions of preferably absorbing the impact by the impact absorber 1 are defined as forward and backward directions. In FIG. 1, the directions are shown as vertical directions. It should be noted that chain double-dashed lines in FIGS. 1 and 2 represent borderlines of varying the curvature of surfaces constituting the surface shape.

The impact absorber 1 is configured with a hollow blow molded article. As illustrated in FIG. 1, the impact absorber 1 includes a front wall 2 and a back wall 3 separated in the forward and backward directions and facing each other and a side wall 4 connecting the front wall 2 and the back wall 3. It should be noted that the impact absorber 1 is in an approximately rectangular parallelepiped shape in FIG. 1 while it may be in an arbitrary shape in accordance with the shape of the vehicle component to be applied. The blow molded article has a thickness of, but not particularly limited to, 50 mm or more, for example, and preferably from 50 to 200 mm.

Figure 3A:
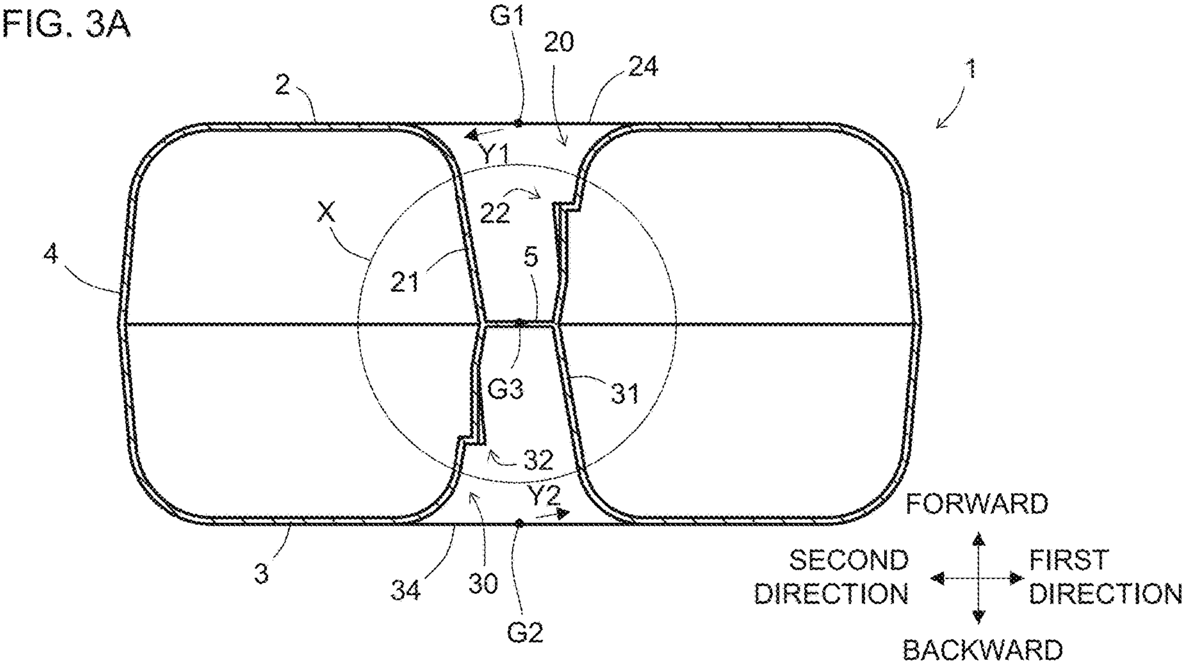
FIG. 3A is a cross-sectional view taken along line A-A in FIG. 2.
Figure 3B:
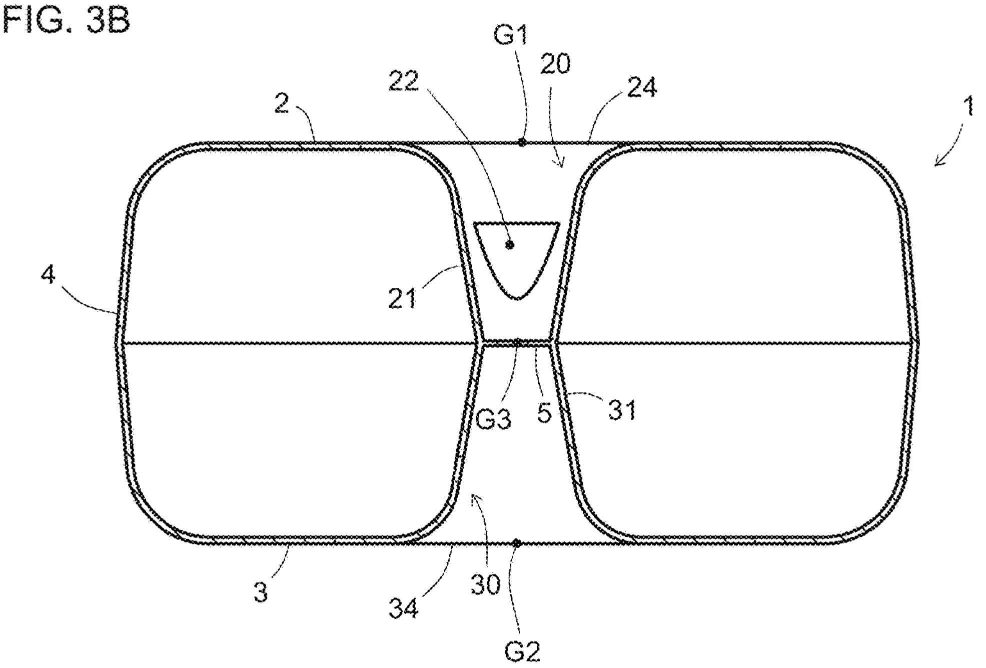
FIG. 3B is a cross-sectional view taken along line B-B in FIG. 2.

As illustrated in FIGS. 2, 3A, and 3B, the front wall 2 includes an approximately cylindrical front side concave rib 20 formed by indenting the front wall 2. As illustrated in FIGS. 3A and 3B, the back wall 3 includes an approximately cylindrical back side concave rib 30 formed by indenting the back wall. The front side concave rib 20 has a surrounding wall 21 and the back side concave rib 30 has surrounding wall 31, both surrounding walls having a closed end and being in a shape tapering toward the distal end. The distal end portions (bottoms) of the front side concave rib 20 and the back side concave rib 30 form a disc-shaped abutment portion 5 by welding in a state of abutting on each other. The abutment portion 5 is formed vertical to the forward and backward directions. It should be noted that, as illustrated in FIGS. 1 and 2, the impact absorber 1 in the present embodiment includes the only one front side concave rib 20 and the only one back side concave rib 30.

As illustrated in FIGS. 3A and 3B, in the present embodiment, the front side concave rib 20 extends backward and the back side concave rib 30 extends forward. That is to say, in the present embodiment, the front side concave rib 20 and the back side concave rib 30 have axial directions respectively coinciding with the forward and backward directions. In this situation, the axial directions of the front side concave rib 20 are the directions, illustrated in FIGS. 3A and 3B, connecting the center of gravity G1 of an opening surrounded by an opening edge 24 (also refer to FIGS. 1 and 2) of the front side concave rib 20 with the center of gravity G3 of the abutment portion 5. The axial directions of the back side concave rib 30 are the directions, illustrated in FIGS. 3A and 3B, connecting the center of gravity G2 of an opening surrounded by an opening edge 34 of the back side concave rib 30 with the center of gravity G3 of the abutment portion 5. The axial directions of the front side concave rib 20 and the back side concave rib 30 may also be considered as directions vertical to the disc-shaped abutment portion 5. In the present embodiment, the axis of the front side concave rib 20 (i.e., the cylindrical central axis constituting the front side concave rib 20) coincides with the axis of the back side concave rib 30 (i.e., the cylindrical central axis constituting the back side concave rib 30). The impact absorber 1 in the present embodiment with the front side concave rib 20 and the back side concave rib 30 arranged in such an orientation has improved strength to the load in the forward and backward directions. It should be noted that the axial directions of the front side concave rib 20 and the back side concave rib 30 may be defined as depth directions of the front side concave rib 20 and the back side concave rib 30.

In addition, in the present embodiment, the cylindrical tubular surrounding wall 21 of the front side concave rib 20 is provided with a front side buckling induction section 22 formed as the origin of buckling for impact absorption. The surrounding wall 31 of the back side concave rib 30 is also provided with a back side buckling induction section 32 similarly formed as the origin of buckling for impact absorption.

Figure 4:
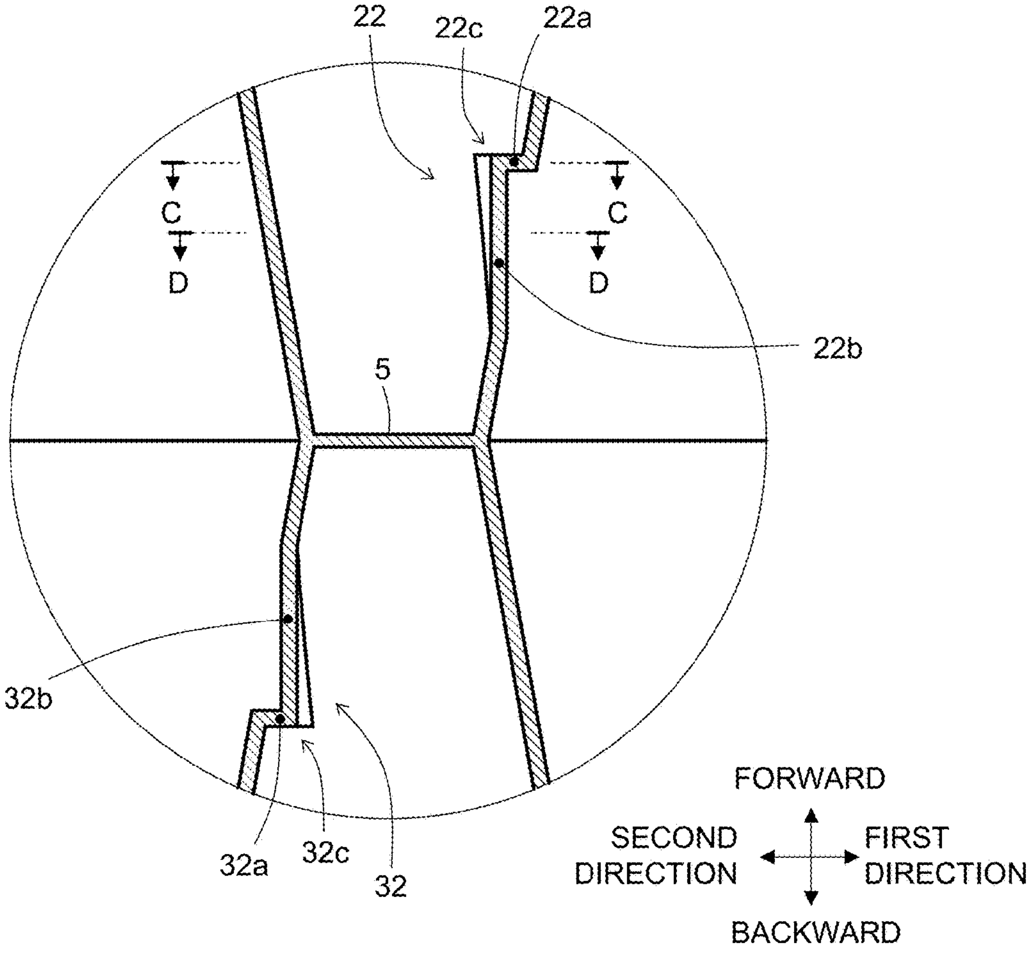
FIG. 4 is an enlarged cross-sectional view of an area X in FIG. 3B.

Specifically, as illustrated in FIG. 4, the front side buckling induction section 22 includes an internally bending portion 22*a* (also refer to FIG. 5A) formed by bending part of the surrounding wall 21 of the front side concave rib 20 inside the front side concave rib 20 (second direction described later) and an upright portion 22*b* (also refer to FIG. 5B) axially extending backward (downward in FIG. 4) from a distal end of the internally bending portion 22*a*. The front side buckling induction section 22 is configured to have a step 22*c*, projecting inside the front side concave rib 20, formed by the internally bending portion 22*a* and the upright portion 22*b* to cause the step 22*c* to be the origin of buckling when a load in the forward and backward directions is exerted on the impact absorber 1.

Similarly, the back side buckling induction section 32 specifically includes an internally bending portion 32*a* formed by bending part of the surrounding wall 31 of the back side concave rib 30 inside the back side concave rib 30 (first direction described later) and an upright portion 32*b* axially extending forward (upward in FIG. 4) from a distal end of the internally bending portion 32*a*. The back side buckling induction section 32 is configured to have a step 32*c*, projecting inside the back side concave rib 30, formed by the internally bending portion 32*a* and the upright portion 32*b* to cause the step 32*c* to be the origin of buckling when a load in the forward and backward directions is exerted on the impact absorber 1.

Figure 5A:
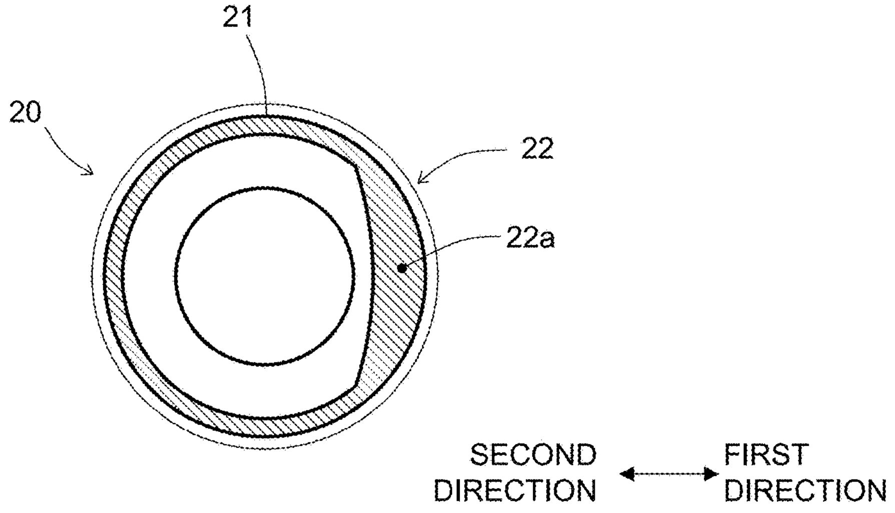
FIG. 5A is a cross-sectional view taken along line C-C in FIG. 4.
Figure 5B:
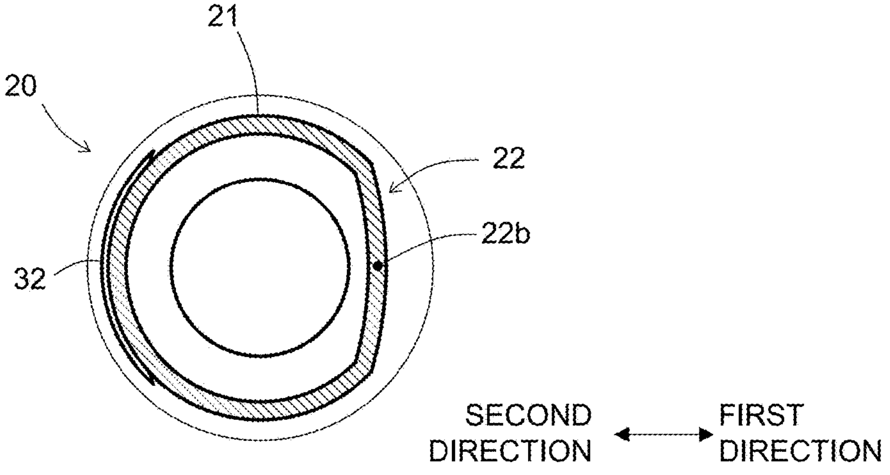
FIG. 5B is a cross-sectional view taken along line D-D in FIG. 4.

As illustrated in the plan view of FIG. 2 and also in FIGS. 5A and 5B, the only one front side buckling induction section 22 is provided in a position on one side (in a position at 180 degrees or less) along the entire circumference in the circumferential direction on the surrounding wall 21 of the front side concave rib 20. In other words, the front side buckling induction section 22 is provided in an inhomogeneous position in a circumferential direction of the front side concave rib 20. Similarly, the only one back side buckling induction section 32 is also provided in a position on one side (in the range of 180 degrees or less, in an inhomogeneous position in the circumferential direction) along the entire circumference in the circumferential direction on the surrounding wall 31 of the back side concave rib 30. In the present embodiment, the front side buckling induction section 22 is provided in a position in a first direction orthogonal to the forward and backward directions (axial directions) and the back side buckling induction section 32 is provided in a position in a second direction orthogonal to the forward and backward directions (axial directions) and shifted 180 degrees to the first direction. Accordingly, in the present embodiment, the front side buckling induction section 22 and the back side buckling induction section 32 are provided in the positions staggered with respect to the abutment portion 5 (refer to FIG. 3A).

2. Method for Producing Impact Absorber 1

Figure 6:
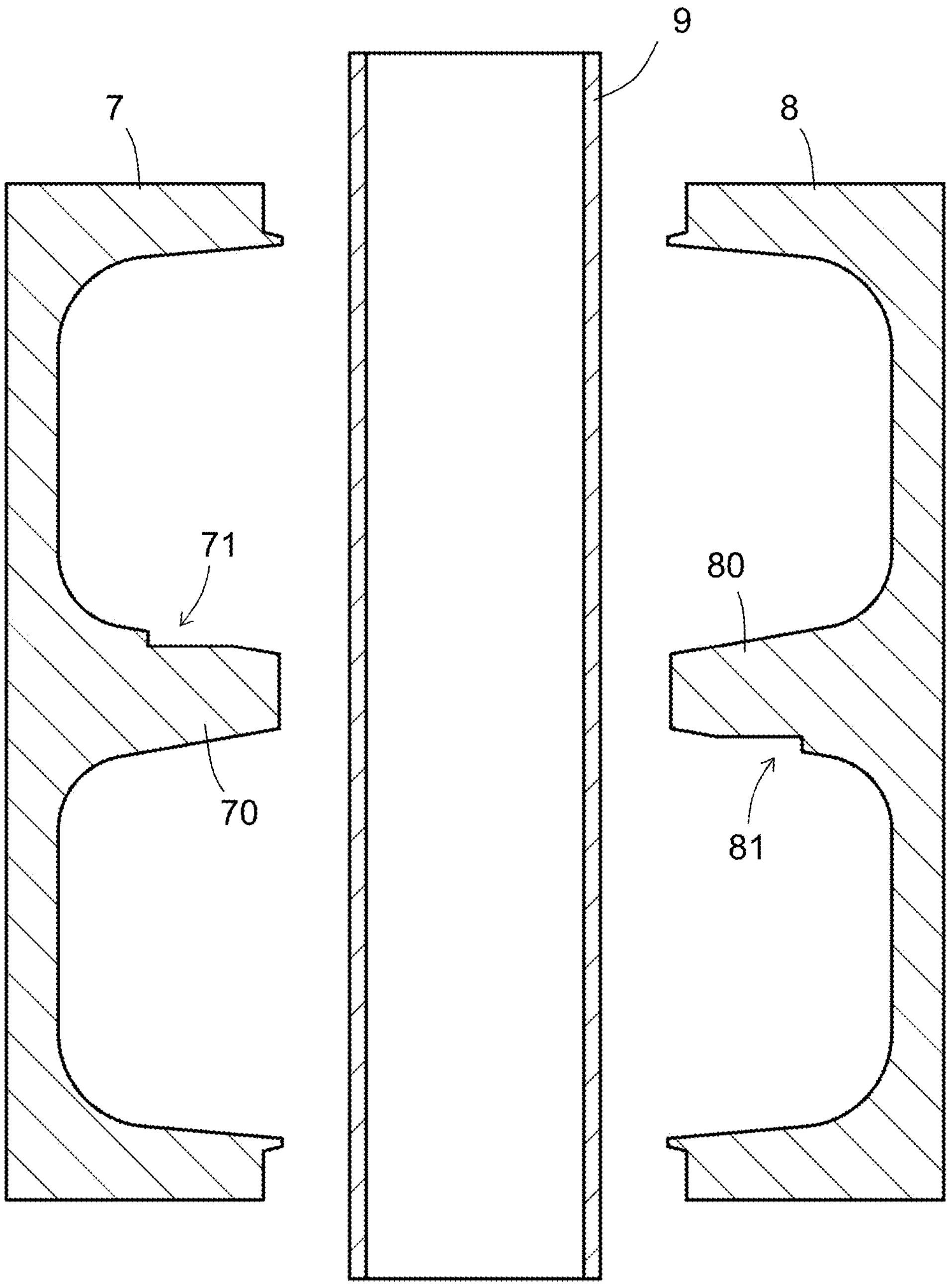
FIG. 6 is a cross-sectional view of the same cross section as that in FIG. 3A illustrating a step of producing the impact absorber 1 in FIG. 1.

As illustrated in FIG. 6, the impact absorber 1 configured as above is produced by closing split molds 7 and 8 in a state of arranging a tubular molten parison 9 between the split molds 7 and 8 and blowing air inside the molten parison 9 to mold a b hollow low molded article. The split molds 7 and 8 are provided with a concave rib forming portion 70 to form the front side concave rib 20, and the concave rib forming portion 70 is provided with an induction section forming portion 71 to form the front side buckling induction section 22. In addition, the split molds 7 and 8 are provided with a concave rib forming portion 80 to form the back side concave rib 30, and the concave rib forming portion 80 is provided with an induction section forming portion 81 to form the back side buckling induction section 32. In this situation, in the present embodiment, the front side concave rib 20 and the back side concave rib 30 formed by the concave rib forming portions 70 and 80 are in a shape tapering toward the respective distal ends and the concave rib forming portions 70 and 80 are also in a shape tapering toward the distal ends. The concave rib forming portions 70 and 80 being in the shape tapering toward the distal ends facilitate mold opening after blow molding. The upright portions 22*b* and 32*b* of the front side buckling induction section 22 and the back side buckling induction section 32 are not tilted inside (refer to FIG. 4), and thus the induction section forming portions 71 and 81 are also not in a shape requiring undercuts to facilitate molding. It should be noted that, in the method for producing the impact absorber 1 according to the present embodiment, the direction of opening the split molds 7 and 8 coincides with the forward and backward directions of the impact absorber 1, in other words, the axial directions (depth directions) of the front side concave rib 20 and the back side concave rib 30. That is to say, the axial directions of the front side concave rib 20 and the back side concave rib 30 are the direction of opening the molds for production of the impact absorber 1.

3. Action and Effect

As just described, the impact absorber 1 in the present embodiment has the front side concave rib 20 provided with the front side buckling induction section 22 and the back side concave rib 30 provided with the back side buckling induction section 32. Then, the front side buckling induction section 22 is provided in a position in the first direction orthogonal to forward and backward directions (axial directions), and the back side buckling induction section 32 is provided in a position in the second direction orthogonal to the forward and backward directions (axial directions) and shifted 180 degrees to the first direction. Such a configuration causes the front side concave rib 20 and the back side concave rib 30 to be laterally buckled in a Z shape as illustrated in FIG. 7 when a load is applied to the impact absorber 1 in the forward and backward directions (axial directions of the front side concave rib 20 and the back side concave rib 30).

Specifically, when a load is applied in the forward and backward directions, the front side buckling induction section 22 provided in the first direction on the surrounding wall 21 of the front side concave rib 20 causes the front side concave rib 20 to buckle in the mode of moving the front side buckling induction section 22 in the second direction opposite to the first direction by bending the step 22*c*. In addition, when the load is applied in the forward and backward directions, the back side buckling induction section 32 provided in the second direction on the surrounding wall 31 of the back side concave rib 30 causes the back side concave rib 30 to buckle in the mode of moving the back side buckling induction section 32 in the first direction opposite to the second direction by bending the step 32*c*. On this occasion, the center of gravity G1 (refer to FIGS. 3A and 3B) of the opening surrounded by the opening edge 24 (refer to FIGS. 1 through 3B) of the front side concave rib 20 moves in a direction crossing the forward and backward directions (axial directions), specifically in a direction having a component of the second direction illustrated by an arrow Y1 in FIG. 3A and a component of the backward direction. In addition, the center of gravity G2 (refer to FIGS. 3A and 3B) of the opening surrounded by the opening edge 34 (refer to FIGS. 3A and 3B) of the back side concave rib 30 moves in a direction crossing the forward and backward directions (axial directions), specifically in a direction having a component of the first direction illustrated by an arrow Y2 in FIG. 3A and a component of the forward direction.

Figure 7:
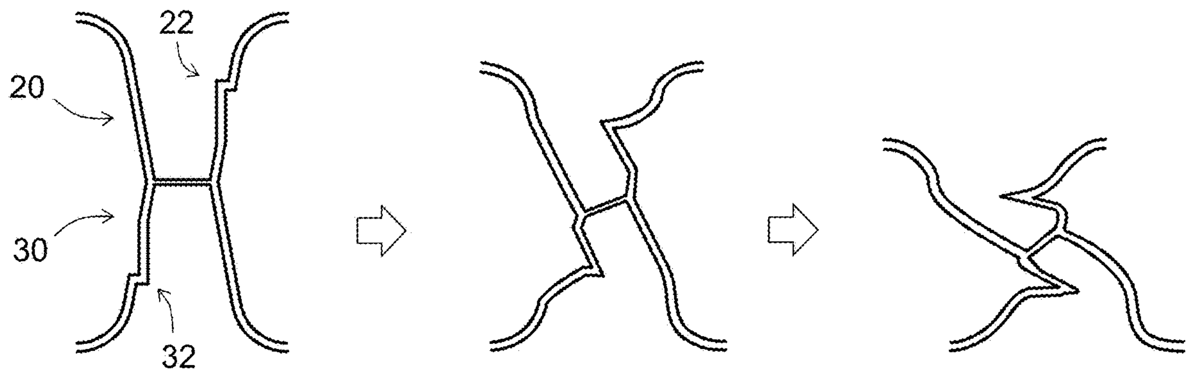
FIG. 7 is a diagram illustrating the state of buckling of the impact absorber 1 according to the present invention.

As illustrated in FIG. 7, such an action causes the front side concave rib 20 and the back side concave rib 30 in the present embodiment to buckle in the mode of laterally buckling in a Z shape.

Figure 8:
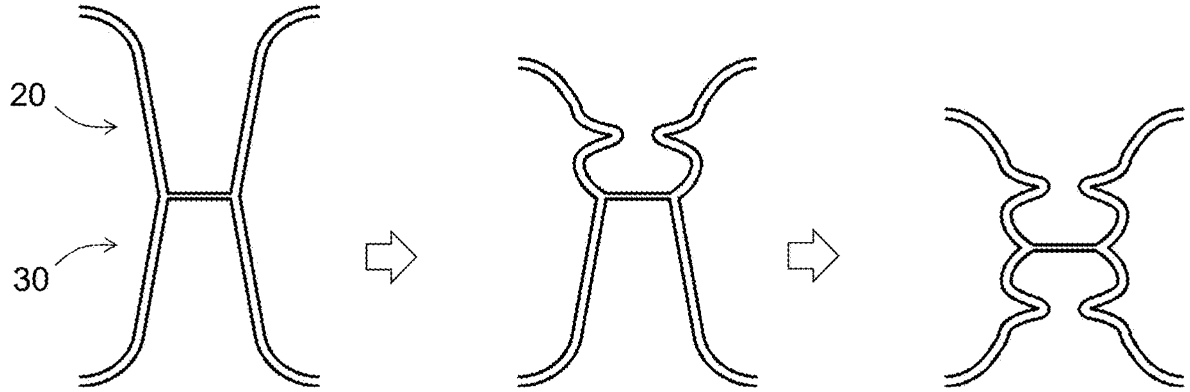
FIG. 8 is a diagram illustrating the state of buckling of an impact absorber according to a comparative example.

Then, the impact absorber 1 in the present embodiment buckling in the mode as above when a load is applied in the forward and backward directions is capable of stabilizing buckling behavior and also improving impact absorption performance compared with a configuration in the past, that is, the configuration where no front side buckling induction section 22 and no back side buckling induction section 32 are provided and the front side concave rib 20 and the back side concave rib 30 vertically collapse (buckle) in a bellowslike manner as illustrated in FIG. 8.

In addition, the impact absorber 1 in the present embodiment including the only one front side concave rib 20 and the only one back side concave rib 30 is capable of laterally buckling the front side concave rib 20 and the back side concave rib 30 in a Z shape preferably compared with a case of including a plurality of such front side concave ribs 20 and back side concave ribs 30.

4. Load Test

The present inventor investigated the relationship between compressive strain and compressive load when a load in the forward and backward directions is applied to the impact absorber 1 including the front side buckling induction section 22 and the back side buckling induction section 32 according to the present embodiment as a working example and to an impact absorber in the past as a comparative example.

Figure 9:
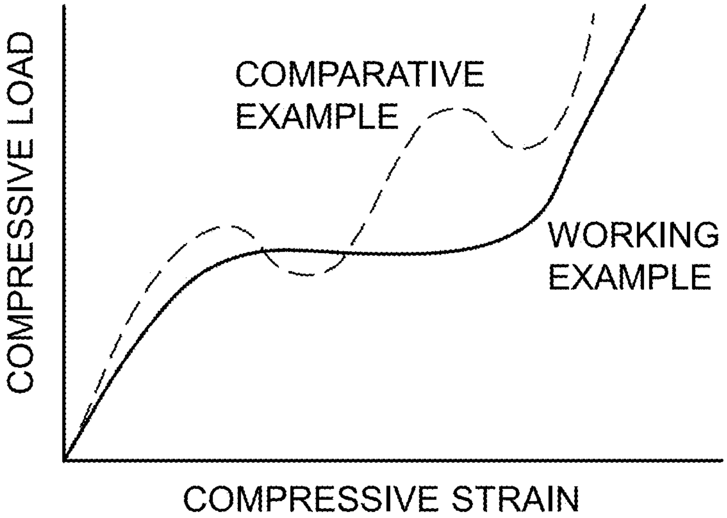
FIG. 9 is a graph illustrating the relationship between compressive strain-compressive load of the impact absorber 1 in the present invention and the comparative example.

On investigation, in the comparative example, as illustrated by the graph of "comparative example" in FIG. 9, the compressive load increased with an increase in the compressive strain and then one of the concave ribs (20/30) collapses in a bellowslike manner (refer to the diagram at the center in FIG. 8) to reduce the compressive load once, however, the compressive load greatly increased by the time the other concave rib (30/20) collapsed later (refer to the diagram on the right in FIG. 8). In addition, even after the other concave rib (30/20) collapsed, the compressive load rapidly increased. This is considered because, in the impact absorber according to the comparative example, the front side concave rib 20 and the back side concave rib 30 collapsed in the bellowslike manner to cause them to be folded up and thus to be not likely to collapse further.

Meanwhile, in the impact absorber 1 according to the present embodiment, as illustrated by the graph of the "working example" in FIG. 9, it was found that the compressive load was suppressed even when the compressive strain increased and a rise in the compressive load later was also inhibited. This is considered because, in the impact absorber 1 according to the working example, the front side concave rib 20 and the back side concave rib 30 were laterally buckled and thus were allowed to keep on deforming in accordance with the compressive load.

5. Modifications

It should be noted that the present invention may be performed in the modes below.

Figure 10A:
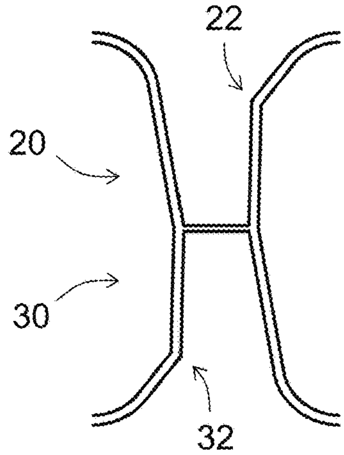
FIGS. 10A through 10C are schematic diagrams illustrating respective concave ribs 20 and 30 of impact absorbers 1 according to modifications of the present invention.

As illustrated in FIG. 4, the front side buckling induction section 22 and the back side buckling induction section 32 in the embodiment described above are configured with the internally bending portions 22*a* and 32*a* and the upright portions 22*b* and 32*b*. However, the front side buckling induction section 22 and the back side buckling induction section 32 may be in a shape to be the origin of buckling for impact absorption and are not limited to such a configuration. For example, as illustrated in FIG. 10A, the front side buckling induction section 22 and the back side buckling induction section 32 may be configured by bending the surrounding walls 21 and 31 of the front side concave rib 20 and the back side concave rib 30 to respectively project inside.

Figure 10B:
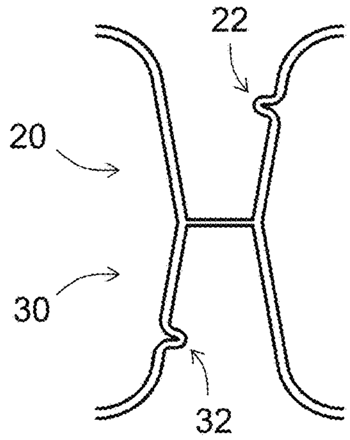

As another example, as illustrated in FIG. 10B, the front side buckling induction section 22 and the back side buckling induction section 32 may be configured by causing the surrounding walls 21 and 31 of the front side concave rib 20 and the back side concave rib 30 to be curved inside in a U shape, respectively. It should be noted that the front side buckling induction section 22 and the back side buckling induction section 32 in this case are in the shape requiring undercuts and thus the production method becomes slightly complex.

Figure 10C:
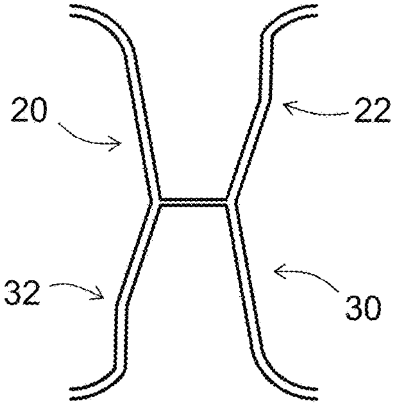

As still another example, as illustrated in FIG. 10C, the front side buckling induction section 22 and the back side buckling induction section 32 may be configured by bending the surrounding walls 21 and 31 of the front side concave rib 20 and the back side concave rib 30 to respectively project outside. The front side concave rib 20 and the back side concave rib 30 in this case are laterally buckled in the opposite direction to the case of the above embodiment.

Figure 11A:
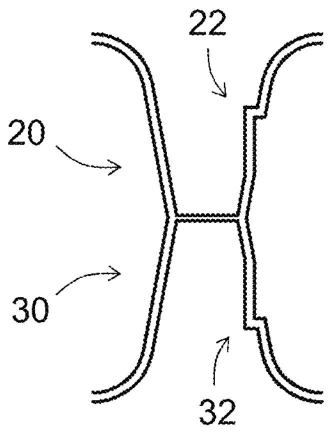
FIGS. 11A and 11B are schematic diagrams illustrating respective concave ribs 20 and 30 of impact absorbers 1 according to other modifications of the present invention.

In the above embodiment, as illustrated in FIG. 3A, the front side buckling induction section 22 is provided in a position in the first direction orthogonal to the forward and backward directions (axial directions) and the back side buckling induction section 32 is provided in a position in the second direction orthogonal to the forward and backward directions (axial directions) and shifted 180 degrees to the first direction. However, as illustrated in FIG. 11A, the front side buckling induction section 22 and the back side buckling induction section 32 may be provided in positions in the same direction. Even in this case, vertical collapse of the front side concave rib 20 and the back side concave rib 30 in a bellowslike manner as illustrated in FIG. 8 is avoided to allow improvement of the impact absorption performance. It should be noted that, to laterally buckle the front side concave rib 20 and the back side concave rib 30 in a Z shape as in the above embodiment, the front side buckling induction section 22 and the back side buckling induction section 32 are preferably provided in positions shifted 90 degrees or more.

Figure 11B:
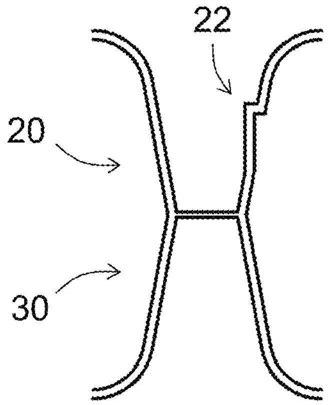

Moreover, as illustrated in FIG. 3A, both the front side concave rib 20 and the back side concave rib 30 in the above embodiment include the buckling induction sections (22, 32). However, as illustrated in FIG. 11B, only one of the front side concave rib 20 and the back side concave rib 30 may be configured to be provided with a buckling induction section.

In the above embodiment, as illustrated in FIG. 2, the only one front side buckling induction section 22 is provided in a position on one side (range of 180 degrees or less) along the entire circumference in the circumferential direction on the surrounding wall 21 of the front side concave rib 20. Similarly, the only one back side buckling induction section 32 is provided in a position on one side (position at 180 degrees or less) along the entire circumference in the circumferential direction on the surrounding wall 31 of the back side concave rib 30. However, such a front side buckling induction section 22 may be provided at a plurality of points as long as each section 22 is provided in an inhomogeneous position in the circumferential direction on the surrounding wall 21 of the front side concave rib 20. In addition, the back side concave rib 30 may be provided at a plurality of points as long as each section 23 is provided in an inhomogeneous position in the circumferential direction on the surrounding wall 31 of the back side concave rib 30.

While the front side concave rib 20 and the back side concave rib 30 are in an approximately cylindrical shape in the above embodiment, they may be in a shape not cylindrical as long as they are in a tubular shape. In this case as well, the axial directions of the front side concave rib 20 and the back side concave rib 30 coincide with the forward and backward directions. It should be noted that the axial directions of the front side concave rib 20 in this case may be defined as directions connecting the center of gravity G1 of the opening surrounded by the opening edge 24 of the front side concave rib 20 with the center of gravity G3 of the abutment portion 5. The axial directions of the back side concave rib 30 may be defined as directions connecting the center of gravity G2 of the opening surrounded by the opening edge 34 of the back side concave rib 30 with the center of gravity G3 of the abutment portion 5 (refer to FIGS. 3A and 3B). In addition, these axial directions may also be defined as axial directions (depth directions) of the tubular front side concave rib 20 and the tubular back side concave rib 30.

The impact absorber 1 in the above embodiment includes the one front side concave rib 20 and the one back side concave rib 30, whereas the impact absorber 1 may include each plurality of the front side concave ribs 20 and the back side concave ribs 30.

REFERENCE SIGNS LIST

1: Impact Absorber, 2: Front Wall, 3: Back Wall, 4: Side Wall, 5: Abutment Portion, 7: Split Mold, 8: split mold, 9: Molten Parison, 20: Front Side Concave Rib, 21: Surrounding Wall, 22: Front Side Buckling Induction Section, 22*a*: Internally Bending Portion, 22*b*: Upright Portion, 22*c*: Step, 24: Opening Edge, 30: Back Side Concave Rib, 31: Surrounding Wall, 32: Back Side Buckling Induction Section, 32*a*: Internally Bending Portion, 32*b*: Upright Portion, 32*c*: Step, 34: Opening Edge, 70: Concave Rib Forming Portion, 71: Induction Section Forming Portion, 80: Concave Rib Forming Portion, 81: Induction Section Forming Portion, G1-G3: Center of Gravity.

The invention claimed is:

1. An impact absorber comprising a hollow blow molded article, wherein the blow molded article includes a front wall and a back wall separated and facing each other and a side wall connecting the front wall with the back wall, the front wall includes a tubular front side concave rib formed by indenting the front wall, the back wall includes a tubular back side concave rib formed by indenting the back wall, and the front side concave rib and the back side concave rib have distal end portions welded to each other, at least one of the front side concave rib and the back side concave rib has a buckling induction section formed as an origin of buckling for impact absorption, when a load is applied in an axial direction of the front side concave rib and the back side concave rib, the at least one of the front side concave rib and the back side concave rib is configured to buckle by the buckling induction section such that at least one of a centroid of an opening surrounded by an opening edge of the front side concave rib and a centroid of an opening surrounded by an opening edge of the back side concave rib moves in a direction crossing the axial direction by the buckling induction section, the buckling induction section is provided in a non-uniform position in a circumferential direction of at least one of the front side concave rib and the back side concave rib, and includes an internally bending portion and an upright portion, the internally bending portion is formed by bending part of a surrounding wall of the at least one of the front side concave rib and the back side concave rib inside the at least one of the front side concave rib and the back side concave rib, the upright portion is formed to axially extend from a distal end of the internally bending portion, and the internally bending portion and the upright portion constitute a step projecting inside the at least one of the front side concave rib and the back side concave rib.

2. The impact absorber according to claim 1, wherein the front side concave rib is provided with a front side buckling induction section, and the back side concave rib is provided with a back side buckling induction section.

3. The impact absorber according to claim 2, wherein the front side buckling induction section is provided in a position in a first direction orthogonal to the axial direction on a tubular surrounding wall of the front side concave rib, and the back side buckling induction section is provided in a position in a second direction orthogonal to the axial direction on a surrounding wall of the back side concave rib and shifted 90 degrees or more to the first direction.

4. The impact absorber according to claim 3, wherein the front side buckling induction section is configured to cause the front side concave rib to buckle in a mode of moving the front side buckling induction section in a direction opposite to the first direction, and the back side buckling induction section is configured to cause the back side concave rib to buckle in a mode of moving the back side buckling induction section in a direction opposite to the second direction.

5. The impact absorber according to claim 4, wherein the first direction is a direction shifted 180 degrees to the second direction.

6. The impact absorber according to claim 1, wherein the impact absorber includes only one of the front side concave rib and only one of the back side concave rib.

* * * * *